March 31, 1931. H. FORDYCE 1,798,249

GARDEN TOOL

Filed Oct. 15, 1928

INVENTOR
H. FORDYCE
BY J.G. Cook
ATTORNEY

Patented Mar. 31, 1931

1,798,249

UNITED STATES PATENT OFFICE

HARRIET FORDYCE, OF ST. LOUIS, MISSOURI

GARDEN TOOL

Application filed October 15, 1928. Serial No. 312,679.

This invention relates generally to garden tools, and particularly to an improved hand tool of this type which is intended for use in performing simple digging and hoeing operations in gardens, the predominant object of the invention being to provide a tool of this class with the aid of which simple digging and hoeing operations in gardens may be performed with greater ease and facility than heretofore with the aid of the tools formerly employed.

Figure 1:
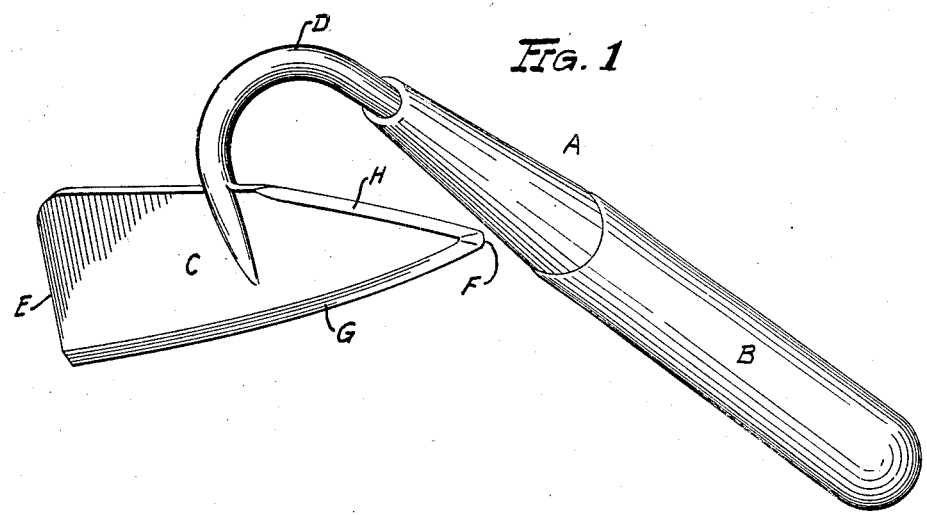
Fig. 1 illustrates a perspective of my improved garden tool.
Figure 2:
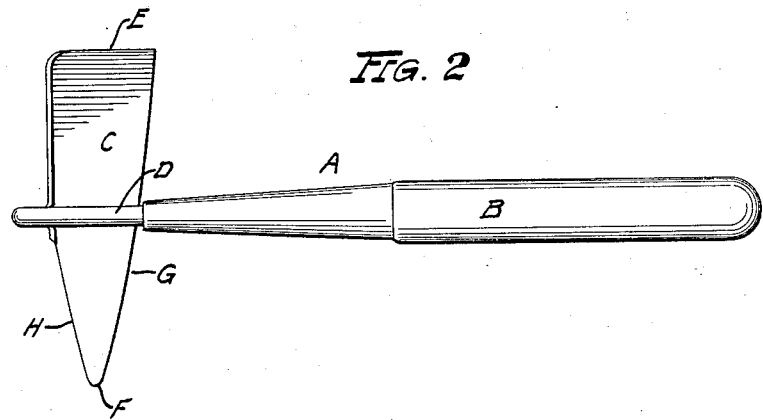
Fig. 2 is a plan view of the garden tool illustrated in Fig. 1 on a reduced scale.

In the drawing, wherein is illustrated one embodiment of my invention, A designates my improved garden tool generally, said tool comprising a handle portion B, a combined digging portion and hoe C, and a curved intermediate portion D which serves to connect the element C to the handle portion B and in this manner provide a unitary tool. The intermediate portion is preferably, though not necessarily, formed integral with the combined digging and hoeing element C, and the end portion of said intermediate portion opposite to the end thereof at which the element C is located is extended into the handle of the tool.

The combined digging and hoeing element C of the tool tapers from its full width at the end E thereof to an approximate point at its opposite end, this pointed end of said element C being designated by the reference character F, and along the bottom edge of said element C I provide a sharpened cutting edge G. In like manner the portion of the top edge of the element C of the tool, between the point F thereof and the curved intermediate portion D, is sharpened to provide a cutting edge H.

In the use of my improved garden tool the tapered portion of the element C thereof adjacent to the point F may be employed as a digging implement, and because of the shape of said portion of said element, and due to the presence of the cutting edges G and H, the digging operation may be performed with ease and facility. Also, because of the tapered shape of the portion of the element with which the digging operation is performed, precise digging may be performed with very little danger that injury will be done to adjacent plants. Likewise in the use of the garden tool disclosed herein, when it is desired to use same as a hoe this may be done by merely turning the tool to a position where the edge G is parallel with and contacts with the surface of the ground when the element C may be caused to function as a hoe by manipulating the tool in the manner common to hand hoes, and because the edge G is slightly curved, portions only of said edge may be employed in hoeing operations to avoid doing damage to adjacent plants.

I claim:

A hand garden tool comprising a handle, and a combined digging and hoeing element associated with said handle, said element being provided with a gradual and continual taper from its full width at one end thereof to an approximate point at its opposite end, and the lower edge of said element and a portion of the upper edge thereof being sharpened to provide cutting edges said lower edge of said combined digging and hoeing element being curved slightly so as to permit various portions of said edge to be used in performing hoeing operations, whereby the likelihood that damage will be done to adjacent plants by said element is lessened.

In testimony that I claim the foregoing I hereunto affix my signature.

HARRIET FORDYCE.